April 20, 1965   K. B. BREDTSCHNEIDER ET AL   3,179,121
REMOVABLE HEAD AND SEAT UNIT BALL VALVE CONSTRUCTION
Filed Oct. 25, 1961                               4 Sheets-Sheet 1

Fig. 1.

Inventors.
Kurt B. Bredtschneider, &
Joseph A. Englert.
By Joseph O. Range
Atty.

April 20, 1965   K. B. BREDTSCHNEIDER ET AL   3,179,121
REMOVABLE HEAD AND SEAT UNIT BALL VALVE CONSTRUCTION
Filed Oct. 25, 1961                                   4 Sheets-Sheet 4

Fig. 4.

Inventors,
Kurt B. Bredtschneider &
Joseph A. Englert.
By Joseph O. Lange
Atty.

United States Patent Office 3,179,121
Patented Apr. 20, 1965

3,179,121
REMOVABLE HEAD AND SEAT UNIT
BALL VALVE CONSTRUCTION
Kurt B. Bredtschneider and Joseph A. Englert, Chicago, Ill., assignors to Crane Co., Chicago, Ill., a corporation of Illinois
Filed Oct. 25, 1961, Ser. No. 147,494
4 Claims. (Cl. 137—454.6)

This invention relates generally to valves, and, more particularly, it is concerned with a ball valve construction in which the valve closure mechanism therefor is removable through the top of the valve body or casing. It is a further modification of patent application Serial No. 147,-521, filed October 25, 1961.

One of the most important objects of this invention is to provide for what is termed a plate-like cartridge type of ball valve construction, in which the ball or spheroidal closure member and the valve seats therefor may be suitably removed conveniently as a unit or cartridge from the top of the valve casing without disturbing the latter in its connections with the pipe line upon which it is ultimately mounted.

A further important object is to provide for a ball valve construction in which the rotatable ported closure unit in its assembly with the valve body may be provided either with tapered or cylindrical seat rings to cooperate with the ball closure member by means of conveniently assembled top and bottom plates mounted thereon. The construction of this invention permits of adjustability from outside the valve casing with relation to the supporting shoulders of the valve body when tapered seat rings are employed.

The construction of this invention also provides adjustably for the ultimate desired positioning of the ported ball closure member considering the said seat rings and their relationship to the valve horizontal axis, all of which will hereinafter become more readily understood.

Another important object is to provide for a ball valve and seating construction therefor in which not only the closure and seats embody removability feature above referred to, but further that the closure member seat rings may also have outer straight or flat seat areas in fluid sealing contact with limitedly floating rings bearing against an outer end portion of the valve body and to the peripheral portion of the closure member or the seat rings therefor.

A still further important object of this invention is to provide for a ball valve construction in which the seat rings, whether the latter are of tapered configuration or of plain cylindrical form, are resiliently mounted and are easily removable as a unit with the closure member, the valve stem and the upper and lower top and bottom retaining plates.

A further important object is to provide for the said removability of the valve closure and stem without requiring detachment or dissassembly of body seat rings.

Other objects and advantages will become more readily apparent upon proceeding with the following description read in light of the accompanying drawings, in which:

FIG. 1 is a fragmentary sectional assembly view of a preferred embodiment of our invention;

FIG. 4 is a sectional view taken on the line 4—4 of FIG. 3.

Similar reference numerals refer to similar parts throughout the several views.

Figure 2:
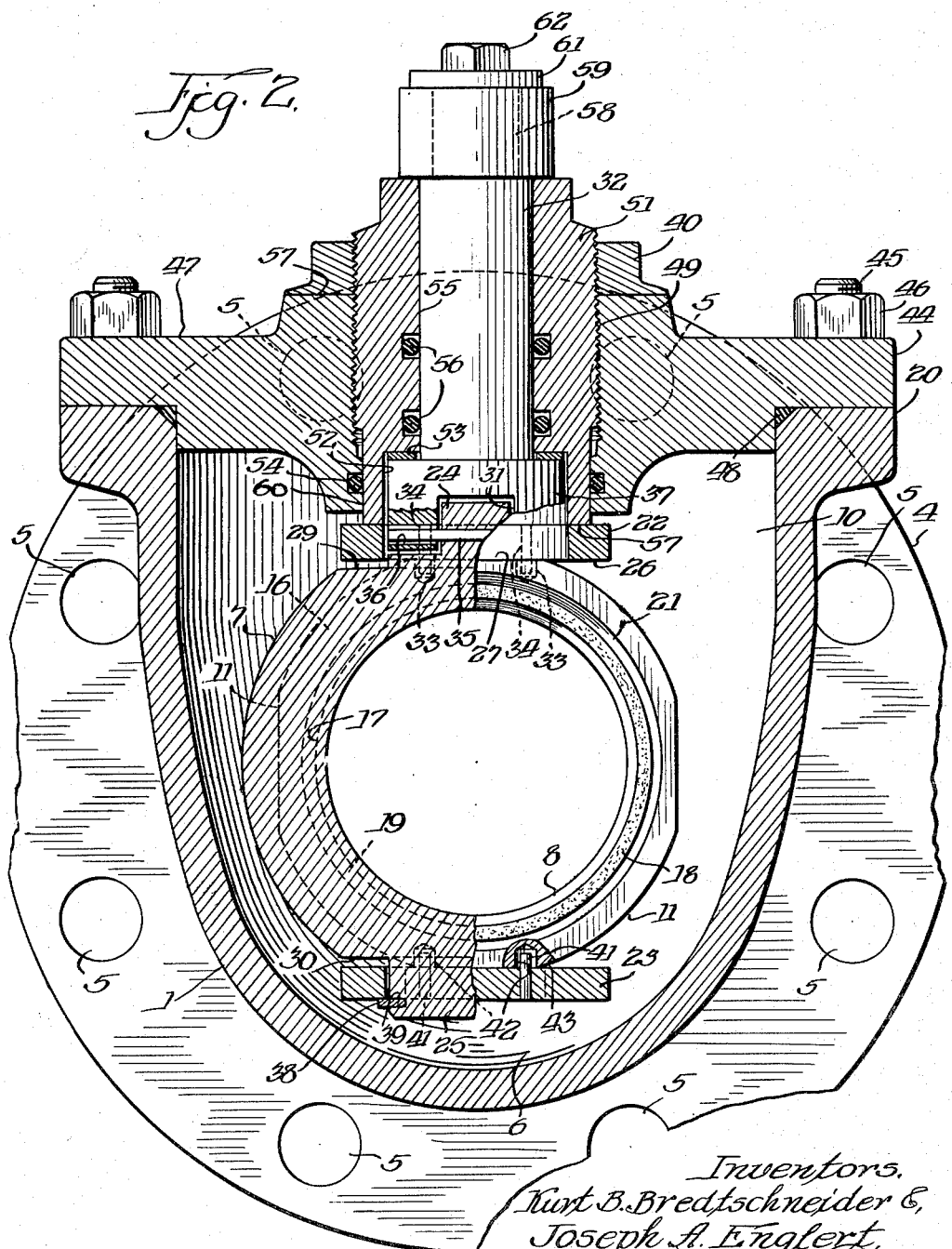
FIG. 2 is a sectional view taken transversely and substantially at right angles to the view referred to in FIG. 1 and with a portion of the ball closure member shown only in partial section.

Referring now to the drawings and more especially to FIG. 1, the valve casing or body designated 1 is provided with the usual flow permitting ports 2 and 3, the outer limits of which ports are defined by end flanges shown at 4 in FIG. 2 for effecting the attachment of the valve assembly to a pipe line (not shown). It will be noted that the end flanges 4 are provided with the usual drilled holes 5 for the reception of bolts (not shown) for making said pipe line connection. While flange ends are shown and described, it will of course be obvious that other forms of pipe line connections, such as welding ends, threaded ends, solder ends, and the like, may be employed for such purpose without affecting the valve constructions embodying this invention.

The valve casing 1 is provided with the median valve chamber 6 within which chamber the ported ball closure member 7 is rotatably contained, the ball closure being transversely ported as at 8 to predeterminately communicate with body ports 2 and 3. It will be noted that the said chamber at its outer end portions is defined by substantially transversely extending slightly tapered straight surfaces 9, as opposed to curved, and against which flat surface the annular seat rings 11 with their seats are mounted in end abutting relation. The inner limits of body ports 2 and 3 communicate with the said valve chamber as shown.

Preferably, although not necessarily, the rings 11 in reference to the tapered annular surface 9 are fluid sealed by means of the recessed O-rings 12, the latter being relatively snugly fitted in the usual manner within the inclined annular grooves 13. The seat rings 11, while generally of cylindrical configuration as shown, are provided at their outer ends with the annular plain or flat surfaces 14 tapered or inclined inwardly to coincide with the taper or angle of the plain surfaces 9 at the end of the valve casing and thus define the outer limits of the valve chamber 6.

At the inner end portions 15 of the seat rings, the annular surfaces are provided which extend transversely as indicated parallel to the central axis of the valve. The surfaces 15 are of annular form and on their inner periphery are provided with the spheroidal concave or frusto-conical surfaces 16 preferably grooved annularly as at 17 to receive snugly the valve seats 18, as previously indicated, which may be of any suitable composition depending upon the service condition encountered in the field. The seats project preferably slightly above the concave surface 16 of said seat ring to provide as at 19 a fluid sealing contact surface for slidable engagement with the ball member 7 on its spherical outer surface 21 as shown. It will be clear that because of the tapered or inwardly inclined surfaces 9 employed the annular seat rings 11 are forced inwardly of the valve casing towards the valve horizontal axis as the closure member is assembled within the body chambers, the said seat rings being mounted over the ball surfaces 21 carrying the seats 18 will be caused to move axially inwardly relatively to the valve axis. Thus, the rings 11 carrying the seats 18 will bear against the spheroidal surface 21 of the closure member with beneficially increased force whereby to facilitate improved valve seating and fluid tightness therebetween.

It will be appreciated that before the closure member 7 together with its attendant seat rings 11 and 18 are positioned in the valve chamber 6 and also in order to provide for a desirable adjustment as well as removability of the seat rings 11 together the ball closure member 7 as a unit or cartridge upper and lower plates 22 and 23 respectively are superposed over the respective integral shanks 24 and 25 of the ball 7. These plates are preferably of oblong configuration when viewed in plan. The undersurface 26 of the upper polygonal plate 22 bears against the flattened upper surface portion 27 of the ring 11, more clearly shown in FIG. 2, thereby to provide an annular chamber as at 28 between the surface 26 and the flat annular surface 29 of the ball closure member 7 and thereby avoiding binding or other interference with the rotation of the ball in the course of its operation. A similar chamber below closure undersurface 30 is provided for the same purpose.

As more clearly shown in FIG. 2, the shank 24 at its upper limit is of reduced width and there it fits non-rotatably within the groove 31 of the valve stem 32 to engage and be actuated by the latter member. Since the upper plates 22 are of oblong form as indicated previously, in order to position the plates 22 against substantial rotation with relation to the ball closure member 7 and the seat rings 11, the latter rings on the upper flat surface thereof are recessed as at 33 substantially at the corners of the oblong configuration to receive the pins 34. The latter are fixedly positioned within the plate 22 either by a force fit, soldering or may be formed integrally therewith. Each of the said pins depends from the upper plate as shown to engage the respective similarly spaced apart recesses 33 of the seat rings thus to hold the plates against relative rotation to the rings 11 as shown probably more clearly in FIG. 2. This pin arrangement thus aids in lifting out the seat rings 11 together with ball closure 7 and the plates 22 and 23 through body opening 10 after removing bonnet 47. The transversely extending pin 35 is received within the similarly extending transverse bore 36 thereby to link the bifurcated shank portion 37 of the stem 32 through the groove 31 with the reduced transverse extension 24 of the ball 7. At the lowermost end portion of the valve chamber 6, the similarly apertured lower plate 23 is applied before assembly of the closure ball with the casing so as to fit over the ball lower shank portion 25. It is held in desired axial position by means of a split ring 38 engaging the annular groove 39 of said shank, and in the manner similarly described in connection with the upper plate 22, and for the same reason, the pins 41 are received within the lower recesses 42 of the seat rings 11. In this sub-assembly, the lower plate 23 will be mounted as shown slight spaced relation to the undersurface 43. However, when it does become necessary to lift the entire assembly from the body opening 10, the plate 23 will then bear directly against the surfaces 43 of rings 11 to support and permitting lifting the entire assembly comprising the ball, the upper and lower plates 22 and 23 together with the connected stem 32 through said body opening.

The opening 10 of the valve casing is flanged at 20 to receive the bonnet flange 44 and in the usual manner by means of the connecting studs 45 and nuts 46 holds the bonnet 47 in fluid sealing mounted relation to the casing as indicated preferably employing an annular sealing gasket 48 (FIG. 2).

At a central open portion thereof, the bonnet 47 is treated as at 49 to receive the threadedly adjustable gland member 51 to allow for suitable axial movement of the said gland in relation to the bonnet cover 47 in effecting an adjustment of the ball closure and seating mechanism as will hereinafter be explained. The said gland member is recessed at its inner portion 52 to receive the enlarged or shoulder portion 37 of the stem. The said enlarged portion is preferably shouldered for outward thrust against the washer 53. On its portion 60 below the adjusting threads, it is maintained in fluid sealing relation to the bonnet by means of the O-ring 54 shown. Above the stem enlarged portion 37, the stem diameter is substantially reduced as indicated and is received within the bore 55 of the threadedly adjustable gland 51 preferably in sealed relation thereto as at 56. The inner end limit of the plain end portion 60 of the threaded gland 51 bears against the upper surface of the plate 22 as indicated at 57, thus insuring the desired inward thrust or load against the ball closure member and seat rings when the gland 51 has been suitably adjusted on its threads 49, thus to provide a suitable predetermined axial position of said gland and the affected closure members. The seat rings 11 after such gland adjustment has taken place have been moved downwardly on the respective inclined annular surfaces 14 relative to the casing tapered surface 9. It will be apparent that this in effect produces the desired axial thrust of the oppositely disposed seat rings 11 inwardly on a horizontal plane against the closure member 7 whereby to provide the desired seating load or compression between the seats 18 and the surface 21 of the ball closure member.

It will also be understood that after said gland and valve closure positioning adjustment has been determined as desired, a threaded locking nut 40 is then applied bearing frictionally against the surface 50 to accomplish the locking purpose.

At the upper end of the stem, a suitable polygonal extension is provided for valve actuating purposes as indicated at 58 for receiving the lever 59 firmly held in place on the stem by means of the washer 61 and the retaining cap screw 62. At an outer end portion thereof, the operating lever 59 may be suitably tapped as indicated at 63 to receive an extension lever (not shown) for improved gripping.

A stop 64 on the lever engages the stop lug 65 of the bonnet member for limiting the rotational movement of the lever and ball closure member to approximately 90 degrees in opening and closing the valve.

In retrospect, it will now be evident that a durable and relatively economical ball valve construction has been provided in which the entire valve internal operating mechanism including the seats and backing rings with connecting plates can conveniently be removed for inspection or repair by the simple expedient of removing the bonnet 47 by loosening and disassembling the studs and nuts 45 and 46 respectively. It will also be apparent that such inspection and replacement therefore entails no greater inconvenience than that which is normally encountered in gaining access to the similarly formed seating faces of say the conventional tapered seat or wedge gate valve. It will be appreciated that the surfaces 9 and their supporting casing portions are similar in such configuration to such gate valve of the wedge type referred to.

Obviously, after the entire inner valve seating mechanism has been removed, it then becomes easy to inspect the faces 9 and refinish or renew them if desired. Further, if such surfaces, or the seats or the ball closure, or the plates, or all, have been damaged or worn in service, by simply replacing the seat rings or refacing them, the refurbished fluid sealing valve seating contacts can quickly be provided between the backing rings and the body and between the seats and the ball closure member.

It will, of course, be understood that similarly beneficial ball seating constructions may be employed in which the type of seat rings and the cooperating back-up rings used may be of the parallel seat construction rather than having the tapered casing contact as shown and described in connection with FIGS. 1 and 2.

Figure 3:
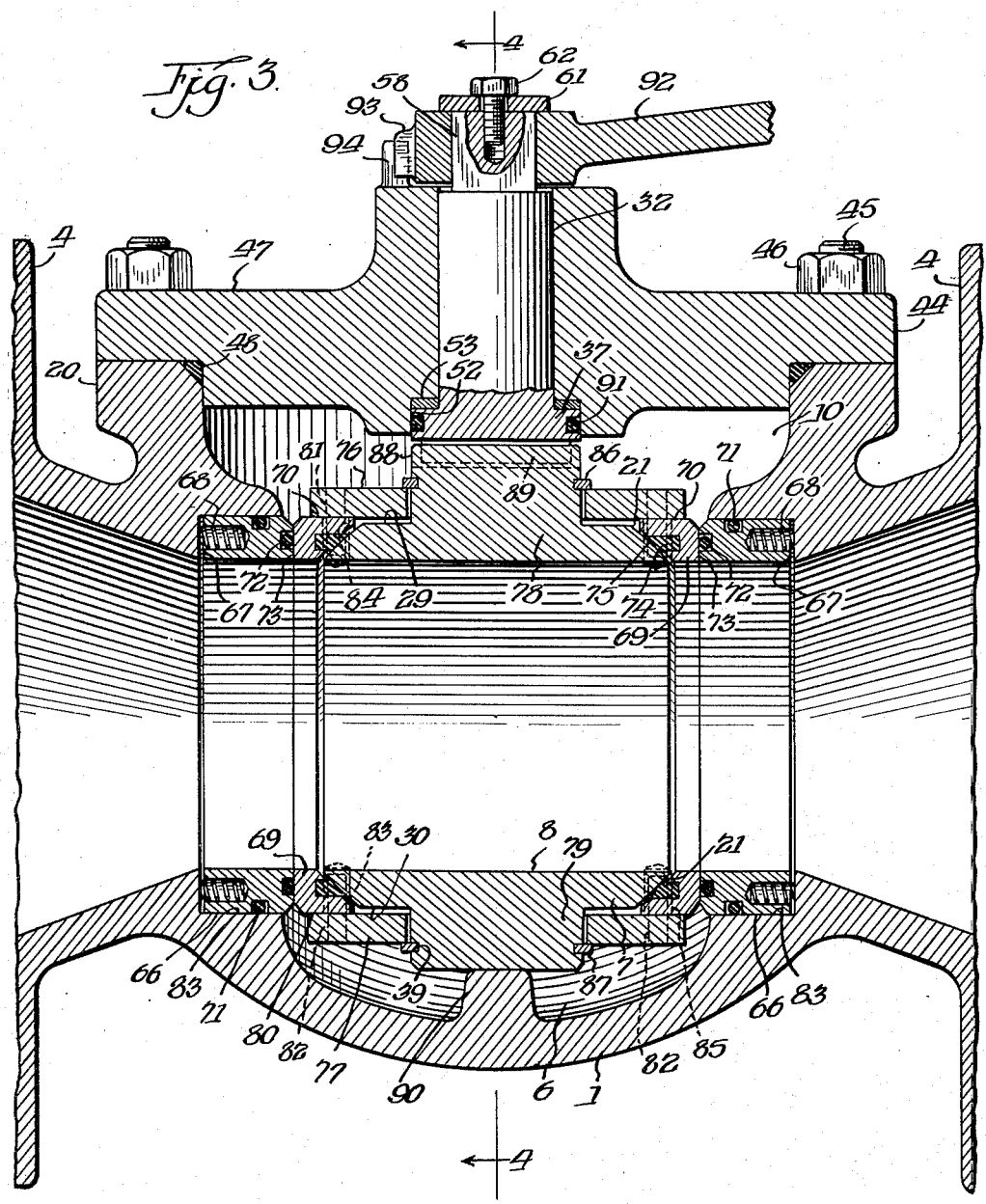
FIG. 3 is a sectional assembly view of a modified form of the invention.

In this modified construction, attention therefore is now directed to FIGS. 3 and 4 in which the closure member 7 is assembled and fitted within the casing valve chamber 6 in substantially the same manner as described in connection with the previous figures. In this modification, however, the seat rings employed are preferably associated with resiliently mounted push or back-up rings as hereinafter explained in more detail. The push or back-up rings 66 are contained and shouldered at 67 within the valve body recess as indicated, and at suitable peripheral locations therebetween in spaced-apart relationship. Such suitable resilient means as the coiled springs 68 are provided to normally cause the said back-up rings to be resiliently mounted and thus thrust inwardly against the body seat rings 69. It will be appreciated that with such resilient mounting of the push rings, fluid tightness of the valve upstream as well as downstream is obtained. This is clearly beneficial also realizing that the ports 2 or 3 can provide interchangeably the inlet or the outlet of the valve. In some cases, resilient packing may be suitably mounted and contained to apply end thrust in the manner of the springs 68. The back-up rings 66 are preferably fluid sealed at a plurality of locations, such as at 71 and 72, and make end abutting contact with the outer annular surface 73 of the seat ring 69. In a manner similar to that described in connection with the seat rings 11 of FIGS. 1 and 2, the cylindrical seat rings of the instant modification are grooved as at 74 whereby to receive in fluid-sealing relation the ball contact seats 75. Because of the end force or thrust exerted by the push rings through their resilient means such as coiled springs 68 the seat rings 69 are axially moved and thereby further the fluid sealing contact of the seats 75 with the surface 21 of the closure member 7.

Likewise in this modified construction, the upper and lower plates 76 and 77 bear respectively on the flat upper and lower surfaces 70 and 80. The said plates being apertured as indicated are mounted on the respective shank portions 78 and 79 of the closure member 7. The plates are preferably of a square configuration when viewed in plan and function in the same manner and for the same reason as described in connection with FIGS. 1 and 2. To hold the upper and lower plates against rotation relative to the ball closure member shanks, suitable spaced apart pins 81 and 82 engage the recesses 84 and 85 respectively of the seat rings 69. In order to maintain the plates 76 and 77 predeterminately in axially limited position they are retained on the respective shank portions 78 and 79 by means of the split rings 86 and 87 in the manner previously described for the other figures.

As shown more clearly in FIG. 4, the upper shank portion 78 of the closure member 7 is provided with the narrow extension 88. The latter portion is received within and thus engages in non-rotatable relation thereto the grooved portion 89 of the stem enlargement 37. It may be fluid sealed as at 91 as shown, employing a thrust washer 53 in the same location and for the same function as previously described in connection with the prior figures. At the end upper portion of the rotatable stem 32, the latter is suitably provided with the polygonal extension 58 to receive the operating lever 92. The latter member is held in place by means of the usual cap screw 62 and the retaining washer 61 in the same manner as described previously. In this construction, the stop means for the valve movement may be conveniently provided to limit such rotational movement of the closure member by means of the lever lug 93 moving between the stop 94 (and another not shown) preferably integral with the bonnet 47.

A preferably integral lug 90 is provided within the casing valve chamber to support and prevent excessive axial movement of the closure member and its assembly with the seats, back-up rings and plates as shown. It will of course be appreciated that such arrangement of the lug 90 for effecting the support of the said ball closure member and its cooperating seating members may be easily modified to provide adjustability axially of the closure by any suitable set-screw and lock-nut in the said lug. Such arrangement will thus function in a manner similar to that described in connection with threaded gland 51 to adjust the axial position of the ball closure member and related parts to the valve ports 2 and 3 of the body. In other respects, the construction is similar to that described in connection with the previous figures and further description is therefore deemed to be unnecessary.

In summary, this contribution to a concededly well developed field embodies a ball valve construction enabling quick and easy removal of the valve internal seating parts including the ball closure member conveniently and without disturbing the casing and the pipe line itself. While a plurality of embodiments have been shown and described, it will be appreciated that the number of variations in modified forms may be numerous while still falling within the terms of the appended claims.

We claim:
1. A ball valve construction;
  a casing having a valve chamber and communicating connecting ends for attachment to a pipe line;
  a ported spheroidal closure member rotatably movable within said valve chamber and removable from the said casing through an opening in the valve chamber;
  a cover for said opening to the valve chamber through which opening the said closure member is removable upon said cover being removed;
  oppositely disposed seat rings supported on tapered casing surfaces defining end limits of said valve chamber, the said rings being aligned axially with said casing connecting ends and having inner recessed surfaces slidably engaging outer curved surfaces of said closure member in the course of opening and closing the valve;
  the said closure member having oppositely disposed shank portions projecting above and below the ported portion;
  upper and lower plate-like means loosely retained on said shank portions of the closure member and having pins linking said seat rings with the said closure member to retain said seat rings to the closure member during movement of the latter member through said valve chamber opening.

2. A ball valve construction;
  a casing having a valve chamber and with openings including connecting ends for attachment to a pipe line;
  a ported spheroidal closure member within said valve chamber removable from the casing through an opening to the valve chamber larger than said casing openings including said connecting ends;
  an apertured cover for said opening to the valve chamber through which opening the said closure member is removable upon said cover being removed;
  axially adjustable seat rings within said valve chamber having flattened edge portions, the rings being normally aligned axially with said connecting ends and having inner recessed surfaces slidably engaging curved surfaces of said closure member providing a fluid seal in opening and closing the valve;
  means in the said cover for adjusting the axial alignment of the said seat rings with said connecting ends;
  the said closure member having transversely extending projecting portions above and below the ported portion;
  upper and lower plate-like means on said projecting portions of the closure member cooperating with said flattened edge portions of said seat rings;
  and projecting means interposed between said plate like means and said seat rings for inhibiting relative rotation therebetween while retaining said seat rings to the said closure member.

3. A ball valve construction;
  a casing having a central valve chamber and communicating connecting ends for attachment to a pipe line;
  the outer limits of the valve chamber having inner transverse inclined annular seating surfaces;
  a ported spheroidal closure member within said valve chamber removable from the casing through an opening in the casing communicating with said central valve chamber;
  actuating means for the said closure member;

a removable cover for said casing opening to the valve chamber journalling said actuating means;

seat rings between said closure member and said casing seating surfaces having inner annular recessed surfaces slidably engaging outer curved surfaces of said closure member in opening and closing the valve and having outer annular surfaces abutting said annular seating surfaces of the casing;

the said closure member having projecting portions immediately above and below the ported portion thereof extending transversely to said ported portion;

the said projecting portion immediately above the ported portion of the said closure member forming a portion engageable by said actuating means;

upper and lower apertured plate-like means enclosing a portion of said projecting portions of the closure member and overlying said seat rings to connect the latter members with the said closure member while restraining both said seat rings and plate-like means against relative rotation;

and means below said actuating means cooperating with the plate-like means to retain said seat rings to the said closure member.

4. The subject matter of claim 3, the said casing having end disposed axially aligned recesses adjoining said connecting ends and back-up rings in said recesses abutting said seat rings.

References Cited by the Examiner

UNITED STATES PATENTS

| | | | |
|---|---|---|---|
| 1,941,839 | 1/34 | Johansson | 251—170 |
| 2,883,146 | 4/59 | Knox | 251—315 XR |
| 3,037,738 | 6/62 | Jackson | 251—315 XR |
| 3,058,484 | 10/62 | Feiring | 251—171 XR |
| 3,081,792 | 3/63 | Hansen | 251—171 XR |
| 3,132,836 | 5/64 | Dickerson | 251—171 |

FOREIGN PATENTS 915,764   7/54   Germany.

ISADOR WEIL, *Primary Examiner.*